A. WATSON.
GATE VALVE.
APPLICATION FILED AUG. 27, 1909.

948,359.

Patented Feb. 8, 1910.
2 SHEETS—SHEET 2.

Witnesses:
Josephine H. Ryan
Ruby Banfield

Inventor:
Alexander Watson.
By Roberts, Roberts & Cushman,
Attorneys.

UNITED STATES PATENT OFFICE.

ALEXANDER WATSON, OF BEACHMONT, MASSACHUSETTS, ASSIGNOR OF ONE-THIRD TO BYRON C. LEAVITT, OF DUXBURY, MASSACHUSETTS, AND ONE-THIRD TO WILLIAM C. MITCHELL, OF MALDEN, MASSACHUSETTS.

GATE-VALVE.

948,359.  Specification of Letters Patent.  Patented Feb. 8, 1910.

Application filed August 27, 1909.  Serial No. 514,846.

*To all whom it may concern:*

Be it known that I, ALEXANDER WATSON, a citizen of the United States, and resident of Beachmont, in the county of Suffolk and State of Massachusetts, have invented new and useful Improvements in Gate-Valves, of which the following is a specification.

My invention relates to gate valves of the type wherein the valves are seated and unseated by a translating or sliding movement substantially normal to the valve seats, and in which when the valves are unseated the movement of translation is in a plane substantially parallel to the valve seats, the valves being thus clearly withdrawn and an unobstructed passage for fluids provided through the valve casing from valve seat to valve seat. The valves of this general type heretofore contrived have not found their way into use at least to any recognizable commercial extent, for the reason that the machine work required to shape their working surfaces presents such difficulties that the cost of construction, from a commercial standpoint, is prohibitive.

My improvements are characterized by a valve wherein the successive movements peculiar to the above described type are secured by a structure so simplified that it may be manufactured with a few easy mechanical operations and thus at a cost which enables the manufacturer to market his product at prices attractive to the consumer. The principle upon which my improved valve operates, resides in the relationship between two oppositely facing valves and in their collective relation to the valve carriage which incloses the valves loosely, *i. e.* with ample clearance; the valve carriage being provided with a pair of wedges which coöperate respectively with complemental pairs of inclined bearing surfaces upon the valve bodies.

Figure 1:
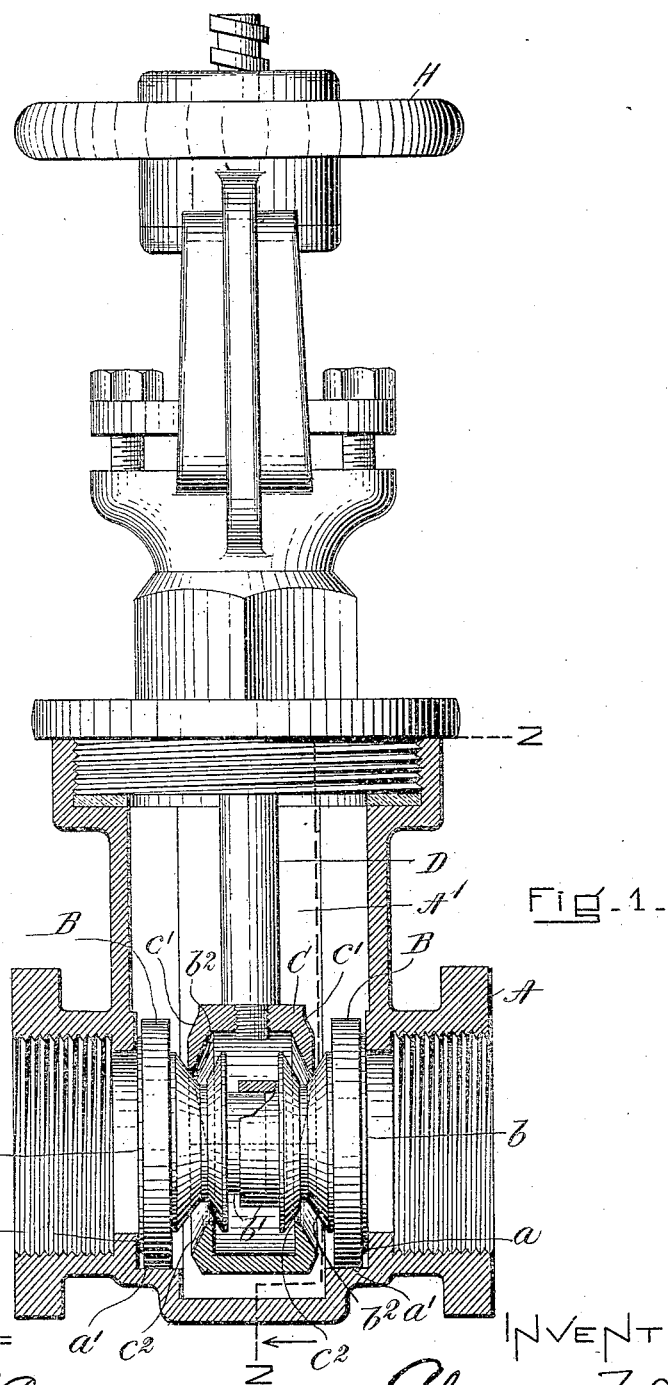
Figure 2:
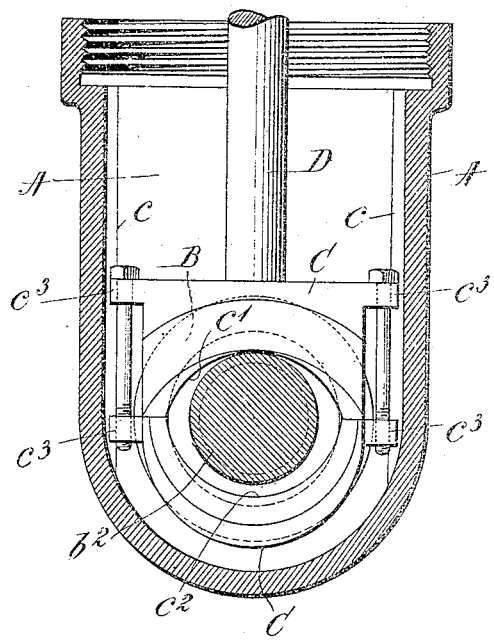

Referring to the drawings which illustrate an embodiment of my invention,—Figure 1 shows, partly in section and partly in elevation, a valve embodying my improvements; and Fig. 2 is a vertical section on line $z$—$z$ of Fig. 1.

A is the valve casing having opposed valve seats $a$ with lateral valve bearings $a'$ adjacent thereto upon which the edges of the valves B bear and which assist in guiding the valves to their seats. The casing A is also provided with a retiring chamber A′ into which the valves B and their carriage C are withdrawn when the valve is open. Upon the interior of the casing A and extending up into the retiring chamber A′ there is formed a guide or guides $c$ for the valve carriage C. The valve carriage is provided with lugs $c^3$ which engage the guides $c$ at either side, the guides serving to hold the valve carriage in its withdrawn position between the two valve seats. The valves B comprise disks having the valve faces $b$ adapted to engage with the valve seats $a$ and on the inner side of each disk there is an extension $b'$; the extensions of the two valves being preferably fitted so as to slide together in telescopic relation as shown in Fig. 1. Also upon the inner side of each valve disk $b$ there are formed inclined bearing surfaces $b^2$ one sloping inwardly from the valve casing and the other sloping outwardly from said casing. The preferred mode of forming these oppositely inclined bearing faces is to turn two oppositely inclined conical surfaces on the valve body. By so doing, any portion of these conical surfaces may serve as an actual bearing surface to operate the valves in the manner presently to be described, and the two valves may thus be left to turn at will while preserving their telescopic relation, a condition which assists in preserving the proper condition for tight seating of the valves. With respect to the disks and inclined bearing surfaces, it is preferable that the two valves should be identical in structure and dimensions.

The valve carriage C in its preferred form, consists of an annular casing which surrounds the inner portion of the valve, and its essential parts are a pair of valve closing wedges $c'$ and a pair of valve opening wedges $c^2$, the wedges $c'$ having surfaces to engage the inwardly sloping bearing faces of the valve and the wedges $c^2$ having surfaces to engage the outwardly sloping bearing faces of said valves. These wedges are so arranged that there is a clearance between them and their complemental bearing surfaces and one pair of wedges at a time engages with said complemental sloping bearing faces upon said valves. The wedging action of the pair of wedges $c'$ draws the two telescopic valves away from each other so that each valve disk is moved to its seat, whereas the wedging action of the pair of wedges $c^2$ draws the two valves toward each other removing the disks from the seats.

The valve carriage C engages with the valve carriage guide $c$ formed on the interior of the casing A and is attached to any suitable moving member as for example the valve stem D, which, by moving the valve carriage up and down by means of the hand wheel H, causes the carriage wedges $c'$ or $c^2$ as the case may be, to engage with the inclined bearing faces on the valves. The movement of the valves in response to the wedging action may be very slight. All that is needed is a movement sufficient to remove the valve disks from their seats enough to allow said valves to be lifted into the retiring chamber without scraping or dragging on the interior of the casing.

In operation, supposing the valve to be closed, the valve stem D is lifted. This lifting movement first disengages the valve closing wedges $c'$ from their complemental bearing faces, then brings the valve opening wedges $c^2$ into contact with their complemental inclined bearing faces, then, by the action of these valve opening wedges the two valve disks are turned from their respective seats being guided in this movement by reason of their mutual telescopic relation and also by means of the valve bearings $a'$ against which the edges of the disks bear. When the opening movement of the valves, which is normal to the valve seats, is complete, continuation of the lifting movement lifts the valve carriage and the valves into the retiring chamber, thus leaving an unobstructed passage through the valve casing from valve seat to valve seat. The closing movement is the reverse of that above described. First, the valve carriage is moved by the valve stem to carry the valve disks to their position opposite their respective seats, that is, to the point where the disks rest on their lateral bearings $a'$. Continued movement of the valve stem forces the valve closing wedges $c'$ into contact with the complemental inclined bearing faces, forcing the valves to their seats.

It will be clear that the valve carriage and its wedges can be controlled by a single mechanical operation and that the machine work necessary to construct the working parts is of so simple and inexpensive a nature that the valve can be readily and inexpensively constructed.

What I claim and desire to secure by Letters Patent is:

1. The combination of a casing provided with opposite valve seats, and a retiring chamber; a pair of oppositely-facing telescopically related valves, each provided with an inwardly sloping bearing and an outwardly sloping bearing; a valve carriage movable into and out of said retiring chamber and provided with a pair of out-wedges to coöperate with the inwardly sloping bearings of the valves, and a pair of in-wedges to coöperate with the outwardly sloping bearings of the valves, the mechanical relation between the wedges and bearings involving a clearance such that one pair of wedges at a time engages with the complemental sloping bearings, and means, such as a valve stem, to actuate the valve carriage.

2. The combination of a casing provided with opposite valve seats, a retiring chamber and a valve carriage guide; a pair of oppositely-facing telescopically related valves, each provided with an inwardly sloping bearing and an outwardly sloping bearing; a valve carriage movable up and down on the valve carriage guide, and provided with a pair of out-wedges to coöperate with the inwardly sloping bearings on the valves, and a pair of in-wedges to coöperate with the outwardly sloping bearings on the valves, the mechanical relation between the wedges and bearings involving a clearance such that one pair of wedges at a time engages with the complemental sloping bearings, and means, such as a valve stem, to actuate the valve carriage.

3. The combination of a casing provided with opposite valve seats, a retiring chamber and a valve carriage guide; a pair of oppositely-facing telescopically related valves, each provided with an upper inwardly sloping bearing and a lower outwardly sloping bearing; a valve carriage movable up and down on the valve carriage guide, and provided with a pair of out-wedges to coöperate with the upper inwardly sloping bearings on the valves, and a pair of in-wedges to coöperate with the lower outwardly sloping bearings on the valves, the mechanical relation between the wedges and bearings involving a clearance such that one pair of wedges at a time engages with the complemental sloping bearings, and means, such as a valve stem, to actuate the valve carriage.

4. The combination of a casing provided with opposite valve seats, a retiring chamber and a valve carriage guide; a pair of oppositely-facing telescopically related valves, each provided with a double-cone bearing; a valve carriage movable up and down on the valve carriage guide and provided with a pair of out-wedges to coöperate with the inwardly sloping cone bearings; and a pair of in-wedges to coöperate with the outwardly sloping cone-bearings, the mechanical relation between the wedges and bearings involving a clearance such that one pair of wedges at a time engages with the complemental cone-bearings, and means, such as a valve stem, to actuate the valve carriage.

5. The combination of a casing provided with opposite valve seats, a retiring chamber, valve bearings and a valve carriage guide, a pair of oppositely-facing valves comprising disks adapted to engage with their respective valve seats and extensions in telescopic relation with each other, each of said valves provided with an inwardly sloping bearing and an outwardly sloping bearing, a valve carriage movable up and down on the valve carriage guide, and provided with a pair of out-wedges to coöperate with the inwardly sloping bearings on the valves and a pair of in-wedges to coöperate with the outwardly sloping bearings on the valves, the mechanical relation between the wedges and bearings involving a clearance such that one pair of wedges at a time engages with the complemental sloping bearings, and means, such as a valve stem to actuate the valve carriage.

6. The combination of a casing provided with opposite valve seats, a retiring chamber, valve bearings, and a valve carriage guide, a pair of oppositely-facing valves comprising disks adapted to engage with their respective valve seats and extensions in telescopic relation with each other and each of said valves provided with a double cone-bearing, a valve carriage movable up and down on the valve carriage guide, and provided with a pair of out-wedges to coöperate with the inwardly sloping cone bearings, and a pair of in-wedges to coöperate with the outwardly sloping cone bearings, the mechanical relation between the wedges and bearings involving a clearance such that one pair of wedges at a time engages with the complemental sloping bearings, and means, such as a valve stem, to actuate the valve carriage.

Signed by me at Boston, Massachusetts this 24th day of August 1909.

ALEXANDER WATSON.

Witnesses:
ROBERT CUSHMAN,
JOSEPHINE H. RYAN.